Patented Apr. 26, 1932

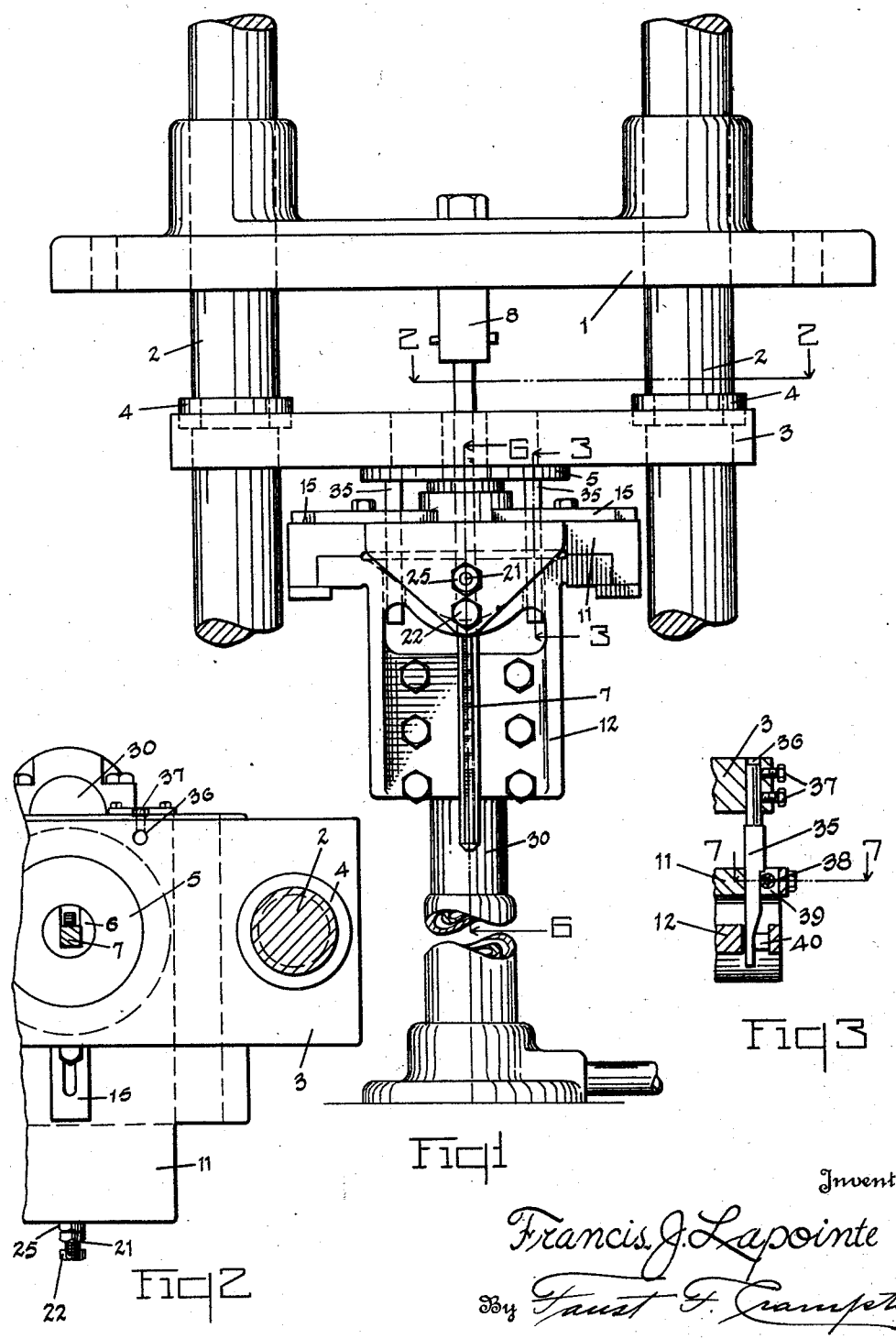

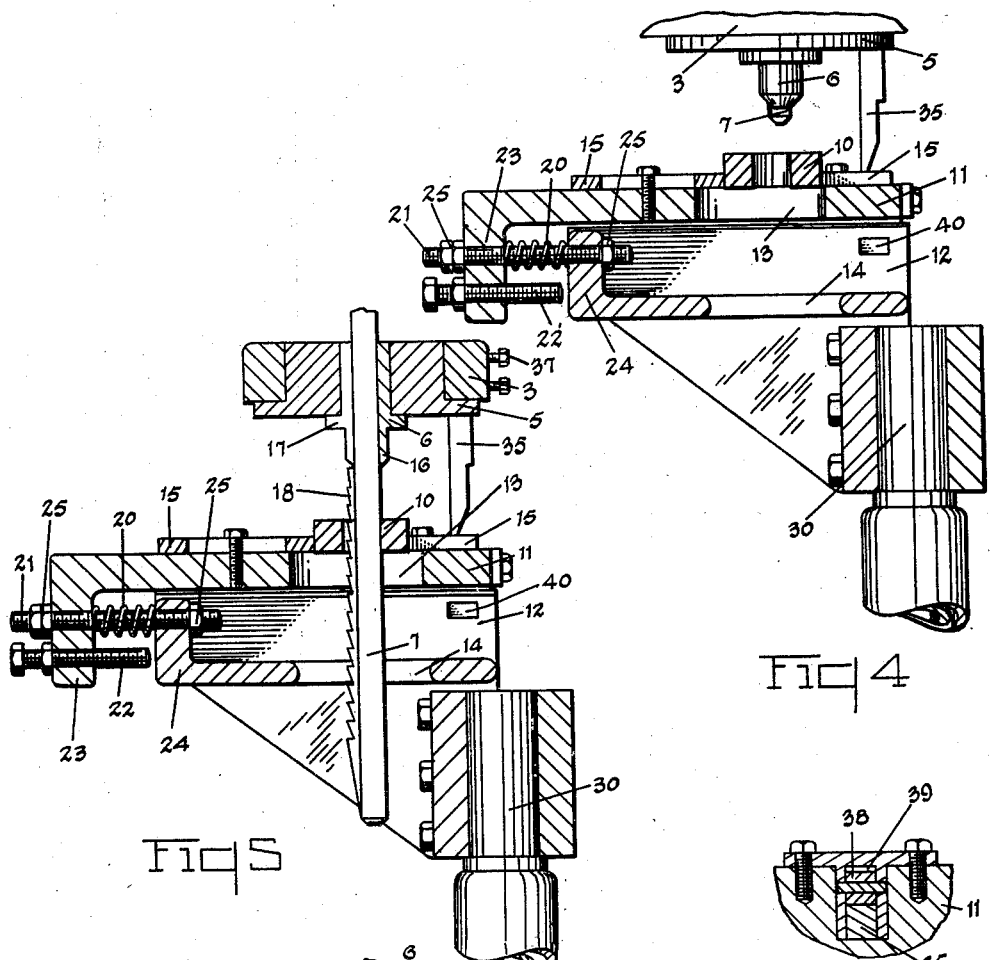
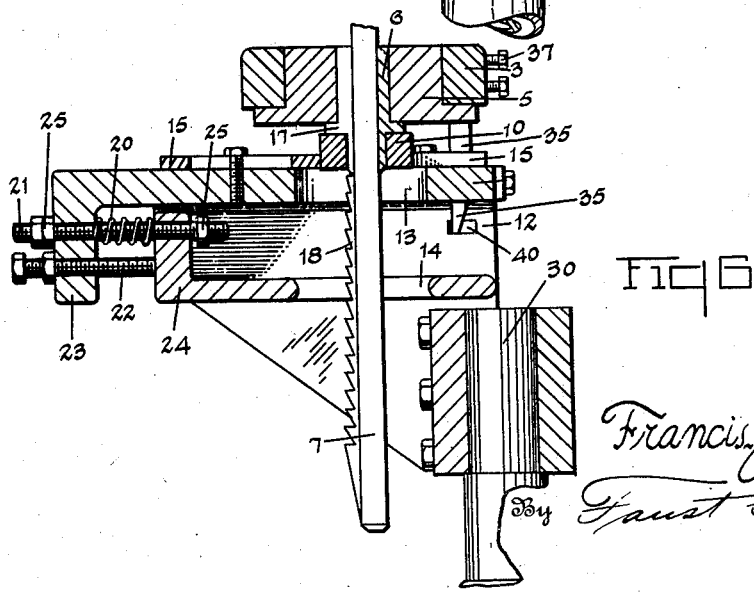

1,855,766

UNITED STATES PATENT OFFICE

FRANCIS J. LAPOINTE, OF ANN ARBOR, MICHIGAN

BROACHING MACHINE

Application filed January 4, 1929. Serial No. 330,344.

My invention has for its object to provide a broach machine, preferably of the vertical pull broach type, wherein the broach may first freely pass relative to the work and the work may then be placed in proper position relative to the broach so that the work will be broach cut. The invention is adapted for use where the broach may readily pass through or by the article in advance of broach cutting the article, and the particular object of the invention is to eliminate disconnection of the pull broach from the draw bar or head to enable the insertion of work in position to be broached.

The invention may be used in connection with broaching machines of different forms and, to illustrate a practical application of the invention, I have selected a vertical pull broaching machine that contains the invention as an example of such structures and shall describe it hereinafter. The machine selected for purposes of illustration is shown in the accompanying drawings.

Fig. 1 is a front view of a part of the broaching machine and illustrates a front view of the particular part embodying my invention. Fig. 2 is a view of a section taken on the plane of the line 2—2 indicated in Fig. 1. Fig. 3 is a view of a section taken on the plane of the line 3—3 indicated in Fig. 1. Figs. 4, 5, and 6, illustrate succeeding positions of parts of the machine during the broaching operations. Fig. 4 illustrates the position of the parts when the broach is about to enter the work. Fig. 5 illustrates the relative positions of the broach and the work as the broach descends through the work. Fig. 6 illustrates the relative positions of the parts just in advance of the broach cutting operation. Fig. 7 is a view of a section taken on the plane of the line 7—7 indicated in Fig. 3.

In the particular form of vertical broach machine, parts of which are illustrated in the drawings, a draw plate 1 is operated by any suitable means, such as by a pair of hydraulic cylinders that may be connected to the ends of the plate 1. A pair of pillars, or guide rods, 2, extend through the draw plate and operate to guide it in its reciprocatory movements. A work plate 3 is supported on the guide rods 2 and is secured in position by means of the collars 4. The work ring 5 is located in the plate 3 and a tool guide 6 is secured in the work ring. The broach 7 is adapted to move through the work ring 5 and the tool guide 6, and is connected to the draw plate 1 by means of the draw head 8. The machine is provided with a means for locating the work in position so that the broach may freely descend relative to the work and when the broach has returned to its broach starting position, the work is properly aligned with the broach for being broach cut.

The work 10, such as a bushing or gear wheel 10, is located on a table 11 that is slidably supported relative to a bracket 12. The table 11 and the bracket 12 are provided with slots 13 and 14 that are adapted to receive the broach 7 and permit free movement of the broach relative to the table and the bracket. The table may be provided with suitable adjustable blocks 15 for locating the work 10 in position relative to the table 11 and the broach 7.

The tool guide 6 is provided with a suitable means for securely holding the work in position relative to the broaching tool during the broaching operation. The means for thus holding the work relative to the broaching tool during the broaching operation will depend upon the shape of the pieces that are being broached. Where rings or bushings or wheels are being slotted, or otherwise cut, the tool guide 6 may be provided with a suitable projection 16 that substantially fits an opening in the work and may be inserted therein to hold the work in a fixed position during the time that the broach is being drawn through the work and is performing its cutting operations. The tool guide 6 is provided with an opening that substantially fits the body of the broach and prevents any lateral play of the broach relative to the work when the work is secured in position relative to the tool guide 6. Also, the tool guide 6 is slotted, as at 17, to permit free movement of the teeth 18 of the broach through the guide 6.

The end of the projecting part 16 of the tool guide 6 is, preferably, beveled or pointed to shift, if desired, the work when it is raised and to center it with respect to the broach. The work may be shifted laterally on the table but, preferably, the table is shifted. This may be done by a conical or inclined surface formed on the tool guide, or by a cam member that operates to shift the table, or the table may be shifted manually.

During the descent of the broach, the table 11 is located in position to permit free movement of the broach 7 through the work by means of a spring 20 and suitable limiting stops that interconnect the table 11 and the bracket 12. When the broach 7 has completed its return movement, the table 11 is shifted relative to the bracket 12 against the tension of the spring 20 and the table 11 is raised to locate the work in engaging relation with the tool guide 6 so that upon drawing the tool 7, the teeth 18 will progressively engage and cut the work. A stop may also be provided for limiting the position of the work to locate it in alignment with the protruding part of the tool guide 6 in advance of the interengagement of the tool guide with the work.

In order to provide adjustments of the limiting stops, to limit the movement of the table 11 relative to its supporting bracket 12, a pair of threaded members 21 and 22 extend through flanges 23 and 24 located respectively on the table 11 and the bracket 12. The threaded member or pin 21 is provided with suitable nuts 25 located on the outside of the flange 23, and on the inside of the flange 24, while the spring 20 is located on the threaded member 21 and intermediate the flanges. The nuts 25 limit the sliding movement of the table 11 induced by the spring 20. To limit the movement of the table 11, so that the work 10 may be placed in position that it may be engaged by the tool guide 6 when the work is raised, the flange 23 of the table 11 is tapped and the threaded member or bolt 22 is screwed therein and in position so that its end will engage the flange 24. The inner end of the bolt 22 is located relative to the flange 24 of the bracket 12 at a point that, when the end of the bolt engages the flange, the work 10 on the table will be positioned in alignment with the work engaging part of the tool guide 6. The work 10 will then be so located that the projection 16 will be located in alignment with the openings within the work 10. When the table 11 has been located in this position, the table 11 may then be raised so as to cause the projecting part 16 to enter and engage the work.

Any suitable means may be provided for raising the table 11. In the particular form of construction shown, the bracket 12 is connected to a hydraulically operated device 30 which will, upon the operation of a suitable valve, raise the table so as to place the work on the end of the pilot 16. The draw plate 1 is then raised and the broach, guided by the tool guide 6, operates upon the work 10 to cut it according to the shape or character of the broaching tool.

In order that the table 11 may be shifted automatically when it is raised by the hydraulic means 30, a suitable cam bar 35 may be connected to the work plate 3 and so as to slidably engage the work table 11 to shift the work table laterally as the work is moved along the shank of the broach and placed upon the protruding part 16 of the tool guide 6. The cam bar 35 may be secured in an opening 36 formed in the work plate 3 by means of key bolts 37 which provide for the adjustment of the cam bar 35. If desired, a roller 38 may be supported in the slot 39 formed in the work table 11 and, as the table 11 is raised, the cam bar 35 enters the space between one end of the slot 39 and the roller 38 so as to force the table 11 and consequently move the work 10 in alignment with the protruding part 16. In order to provide for the length of the cam bar 35, an opening 40 may be formed in the bracket 12 to provide clearance for the end of the cam bar 35. If desired, a pair of cam bars 35 may be secured on opposite sides of the broach and to the rear of the work ring 5 to prevent any binding of the work table 11 in its movement relative to the bracket 12.

I claim:

1. In a broach machine having a reciprocal draw plate and a broach connected to the draw plate, the combination of a work supporting member for locating the work in position to permit the broach to pass through the work without operation on the work when the broach moves in one direction, means for shifting the work supporting member to locate the work in broach cutting position, a broach guide and means for securing the broach guide in position, and means for moving the work supporting member to interconnect the broach guide to the work.

2. In a broach machine having a reciprocal draw plate and a broach connected to the draw plate, the combination of a work supporting member for locating the work in position to permit the broach to pass through the work without operation of the work when the broach moves in one direction, means for shifting the work supporting member to locate the work in broach cutting position, a broach guide and means for securing the broach guide in position, and means for moving the work supporting member to interconnect the broach guide to the work upon shifting the work supporting member to locate the work in broach cutting position.

3. In a broach machine having a reciprocal draw plate and a broach connected to the draw plate, the combination of a work supporting member for locating the work in position to permit the broach to pass through the work without operation on the work when the broach moves in one direction, a broach guide for guiding the broach relative to the work and means for securing the broach guide in position, means for shifting the work supporting member in the direction transverse to the axis of the broach to locate the work in broach cutting position, and means for raising the work supporting member for securing the work to the broach guide.

4. In a broach machine having a reciprocal draw plate and a broach connected to the draw plate, the combination of a work plate and a work table, means for securing the work plate in position to engage the work when operated upon by the broach, a broach guide secured in the work plate and having means for connecting the broach guide with the work, the work table for locating the work in position to permit the broach to pass through the work without operation of the work and while the broach is connected to the draw plate and when the broach moves in one direction, means for shifting the work table in a direction transverse to the axis of the broach and means for raising the work table to locate the work in broach cutting position and to connect the broach guide to the work.

5. In a broach machine having a reciprocal draw plate, a broach connected to the draw plate, the combination of a work plate and a broach guide located in the work plate and having a part protruding towards the work and for engaging the work, a work table for locating the work in position to permit the broach to pass through the work without operation on the work when the broach moves in one direction, means for moving the work table towards the work plate and the guide, and means for shifting the work table to locate the work in broach cutting position to connect the protruding part of the broach guide to the work.

6. In a vertical pull broach machine, a tool guide having a projecting part for engaging the work, a work table for supporting the work, means for shifting the work to locate the work in position for free movement of the tool relative to the work, means for raising the work to locate the work on the projecting part of the tool guide and in position to be operated upon by the tool.

7. In a vertical pull broach machine, a tool guide having a projecting part for engaging the work, a work table for supporting the work, means for shifting the work to locate the work in position for free movement of the tool relative to the work, means for shifting the work to place it in position to be operated upon by the tool, and means for raising the work to place it on the protruding part of the tool guide.

In witness whereof I have hereunto signed my name to this specification.

FRANCIS J. LAPOINTE.